United States Patent
Hardin

[15] 3,688,614
[45] Sept. 5, 1972

[54] MOUNTING ARRANGEMENT FOR LATHE CUTTING TOOLS

[72] Inventor: William M. Hardin, P.O. Box 73, Clyde, N.C. 28721

[22] Filed: April 19, 1971

[21] Appl. No.: 135,130

[52] U.S. Cl. .................................. 82/37, 82/36 A
[51] Int. Cl. ............................................ B23b 29/28
[58] Field of Search .......................... 82/36, 36 A, 37

[56] References Cited

UNITED STATES PATENTS 3,191,471   6/1965   Stewart ........................ 82/36
2,527,871  10/1950   Bakewell ................... 82/36 A Primary Examiner—Leonidas Vlachos
Attorney—Parrott, Bell, Seltzer, Park & Gibson

[57] ABSTRACT

A mounting arrangement for lathe cutting tools which has enhanced resistance to forces arising during cutting operations which tend to force a cutting tool away from proper operative relation with a workpiece. By particular cooperation of first and second blocks and first and second spindle elements, a variety of single cutting point tool members are accommodated for mounting in proper operative relation.

13 Claims, 13 Drawing Figures

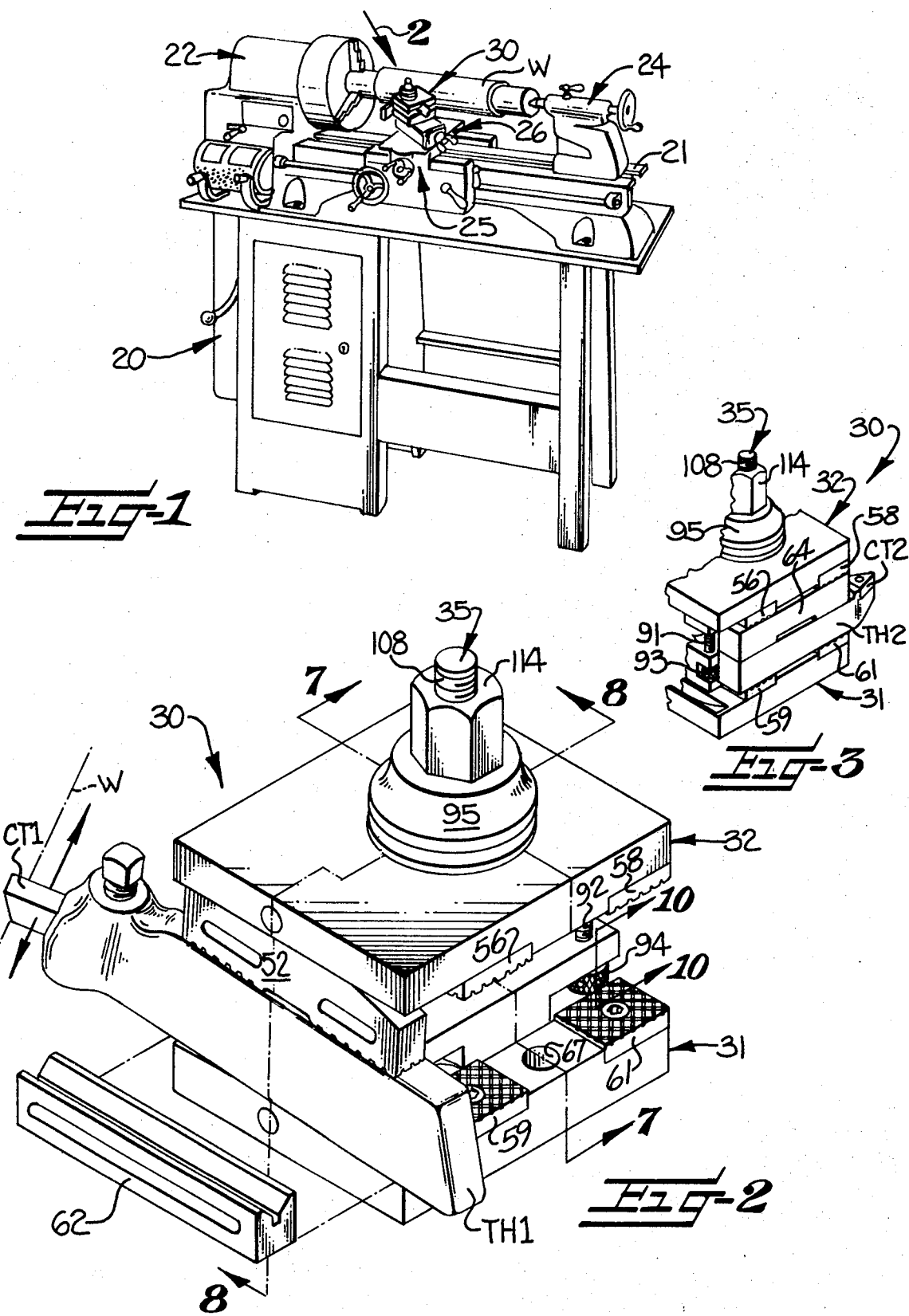

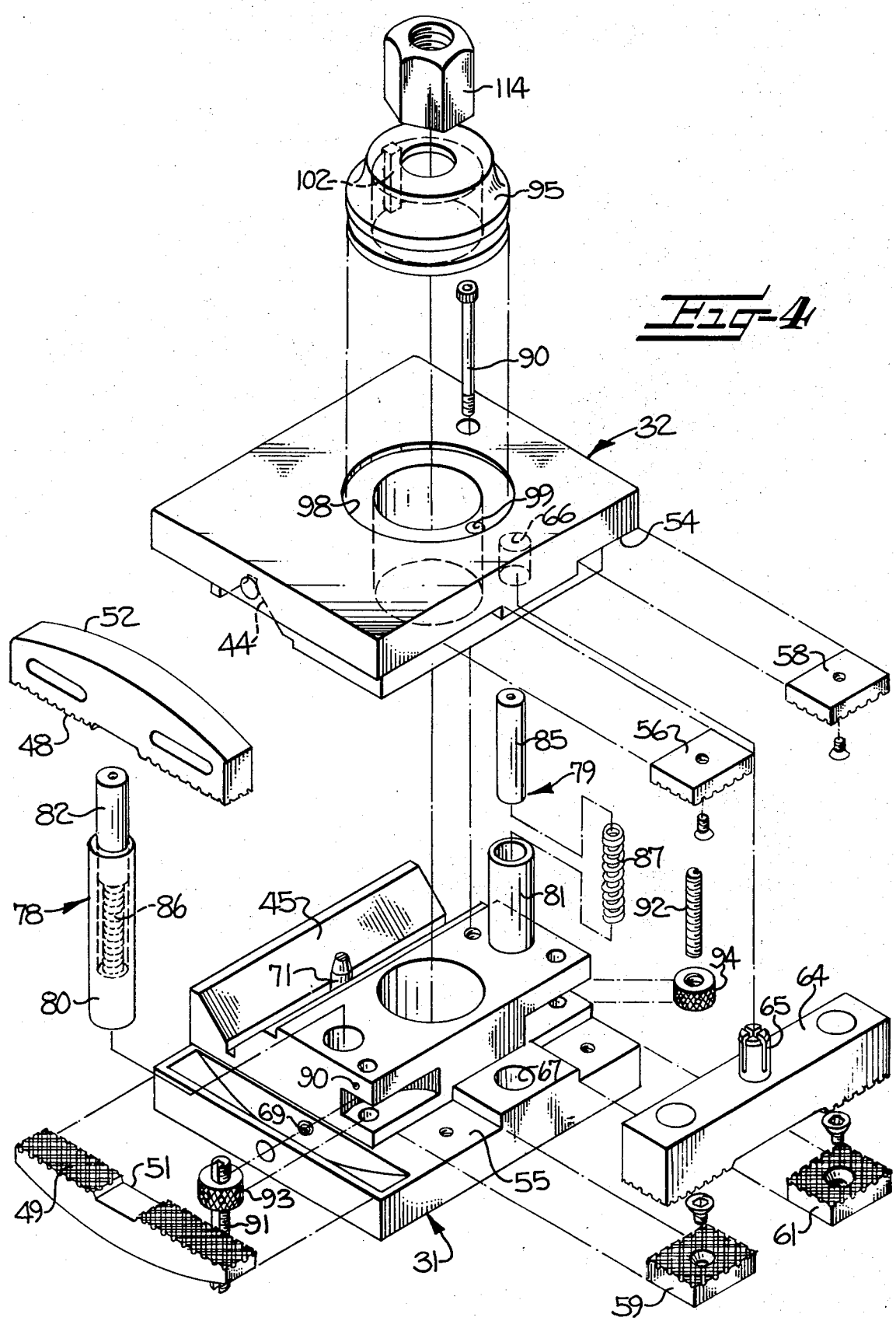

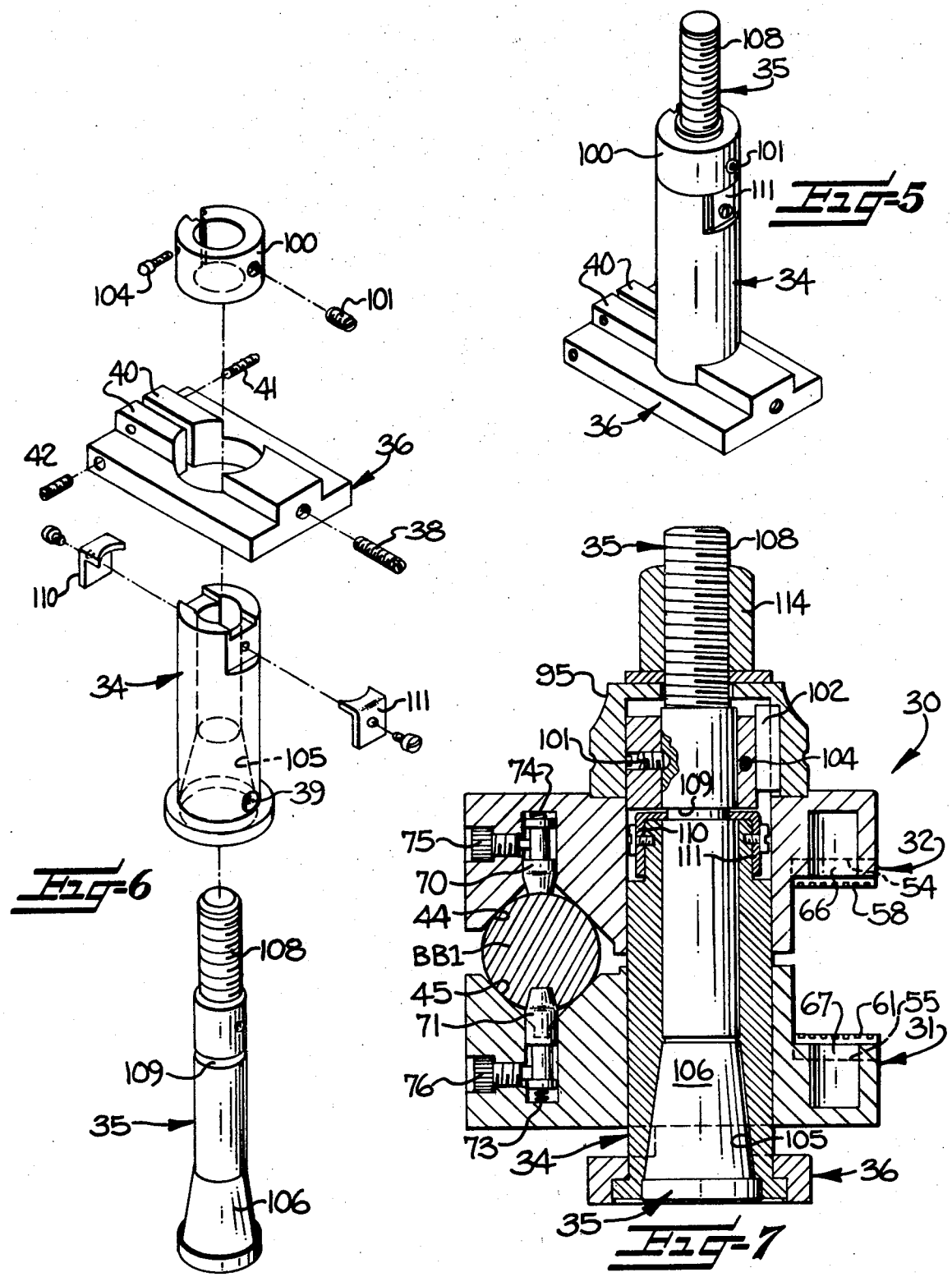

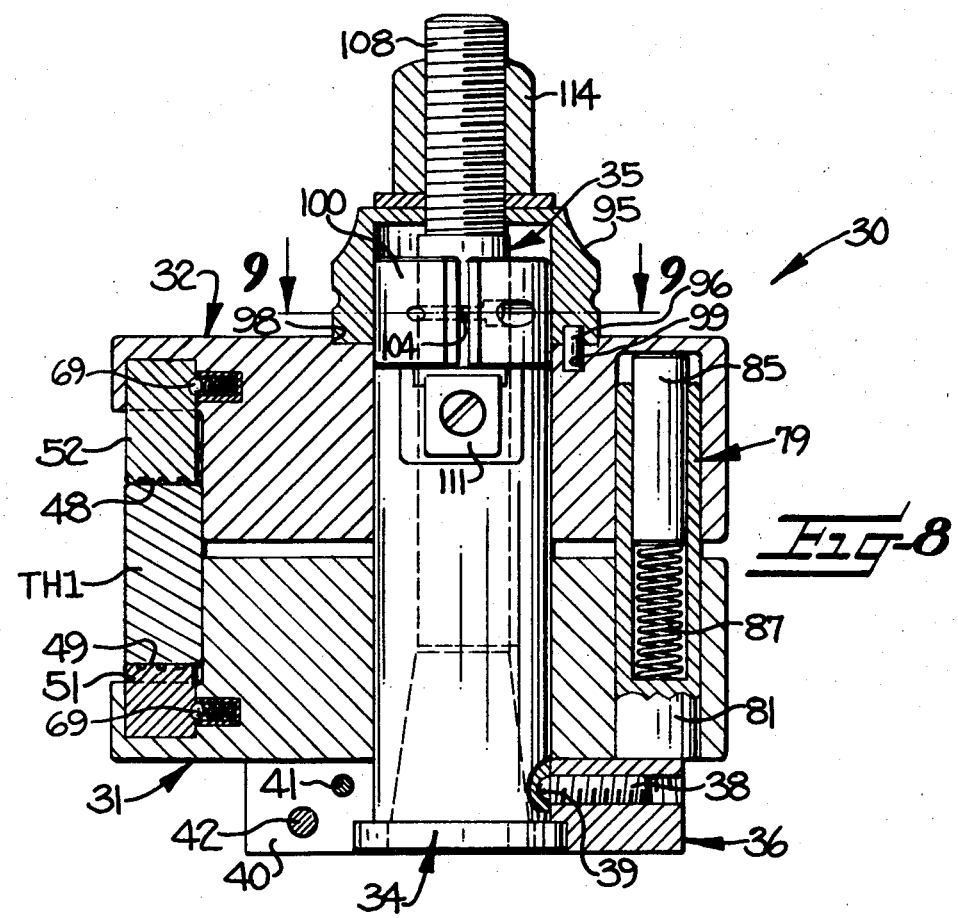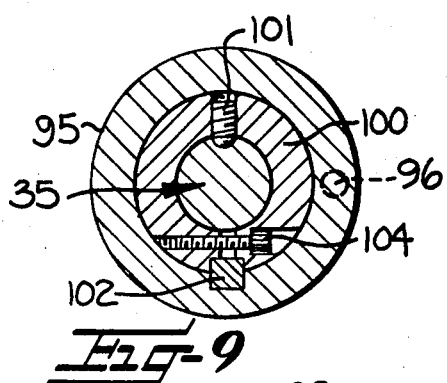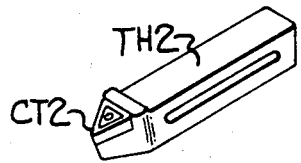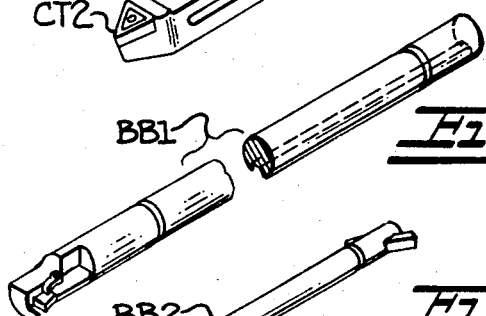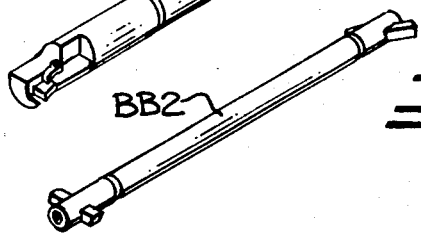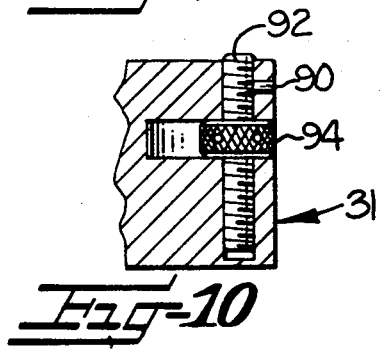

MOUNTING ARRANGEMENT FOR LATHE CUTTING TOOLS

One general class of metal working tools with which every skilled machinist is familiar is the class of machines known as lathes. Among the various types of lathes which have been developed and used, the most versatile is the single cutting point lathe or engine lathe. As is recognized, as engine lathe operated by a skilled machinist can employ a wide variety of types of cutting tools in performing a wide variety of machine operations.

In best utilizing the wide versatility of such a lathe, it is common for a machinist operating the lathe to frequently change from one type of cutting tool to another, as in making choices among conventional tool steel cutters, replaceable carbide tip cutters, boring bars and the like. Heretofore, such interchange among various cutting tool members has required a machinist to dismount from the lathe compound corresponding tool holders or tool posts, inasmuch as each type of cutting tool member has a corresponding type of mounting arrangement. As a result, an operator engaged in the machining of a particular workpiece may find himself spending more time changing tool holders and tool posts than in cutting operations.

It is an object of the present invention to accomplish ready interchange among a variety of cutting tool members used with an engine lathe or the like, thereby increasing the efficiency of the lathe operator through decreasing the time spent in setting up the lathe for cutting operations. In realizing this object of the present invention, a lathe cutting tool mounting arrangement is employed wherein a pair of block means are arranged to receive therebetween a variety of cutting tool members. Thus, an operator changing from a first type of cutting tool member to a second type of cutting tool member need not dismount the arrangement of the present invention in making such a change.

Particularly in the use of carbide tip cutting tool members, cutting rates are obtained which give rise to relatively great forces acting on the cutting tool member and on the mounting arrangement therefor. Heretofore, optimum cutting rates using carbide tip cutting tool members have been difficult to achieve on engine lathes, due to an inability of the tool posts or tool holders employed to resist such forces and maintain the cutting tool member in the desired position relative to a workpiece. Typically, difficulty is encountered in that the cutting tool member backs away or is withdrawn from the workpiece upon such forces taking effect.

It is an object of the present invention to accommodate carbide tip and other high cutting rate tool members to the operation of an engine lathe, through enhanced resistance of a lathe cutting tool mounting arrangement to forces arising during cutting operations which otherwise tend to force the cutting tool away from the workpiece. In realizing this object of the present invention, block means which support a cutting tool member in operative relation with the workpiece and spindle means which penetrate the block means are arranged for selective locking together. By such selective locking, rotation of the block means and one of the spindle means is permitted for positioning of a cutting tool during initial setup of the lathe, while tool forces arising during cutting operations are resisted in a particularly favorable manner.

Some of the objects and advantages of the invention having been stated, others will appear as the description proceeds, when taken in connection with the accompanying drawings, in which FIG. 1 is a perspective view of a lathe incorporating the lathe cutting tool mounting arrangement of the present invention;

FIG. 2 is an enlarged perspective view of the mounting arrangement of the present invention illustrating the accommodation thereof to a first type of cutting tool member;

FIG. 3 is a reduced scale view similar to FIG. 2, illustrating the accommodation of the mounting arrangement of the present invention to a second type of cutting tool member;

FIG. 4 is an exploded perspective view of certain elements of the mounting arrangement of the present invention;

FIG. 5 is a perspective view of portions of the mounting arrangement of the present invention;

FIG. 6 is an exploded perspective view of the mounting arrangement portions of FIG. 5;

FIG. 7 is an elevation view, in section, through the mounting arrangement of the present invention as arranged to accommodate a third type of cutting tool member, with FIG. 7 being taken generally as along the line 7—7 in FIG. 2;

FIG. 8 is a view similar to FIG. 7, taken generally along along the line 8—8 in FIG. 2;

FIG. 9 is a plan view, in section, of a portion of the mounting arrangement of FIGS. 2–8 taken generally along the line 9—9 in FIG. 8;

FIG. 10 is a detailed elevation view taken generally as indicated by the line 10—10 in FIG. 2;

FIG. 11 is a perspective view of the second type of cutting tool member, accommodated by the mounting arrangement of this invention as illustrated in FIG. 3;

FIG. 12 is a perspective view of one type of boring bar cutting tool member, accommodated by the mounting arrangement of this invention as indicated in FIG. 7; and FIG. 13 is a perspective view of a second type of boring bar cutting tool member.

In the detailed disclosure which follows, the lathe cutting tool mounting arrangement of the present invention will be described with particular reference to an engine lathe generally indicated at 20 (FIG. 1) and a mounting arrangement generally indicated at 30 (and shown in detail in FIGS. 2–10). At the outset of this disclosure, however, it is to be understood that the drawings particularly referred to hereinafter are to be construed as illustrative of rather than as limiting on the mounting arrangement of this invention.

As is known to machinists, an engine lathe such as the lathe 20 includes a lathe bed 21, a head generally indicated at 22 and a tail stock generally indicated at 24 which cooperates with the head 22 in mounting a workpiece W for rotation about an axis parallel to the bed 21. Mounted for movement along the bed 21 is a cross-head generally indicated at 25, having mounted thereon a supporting member known as a compound 26. The compound 26 conventionally has a T-slot formed therein and is arranged for movement in two coordinates of a horizontal plane.

In conventional lathe operation practice, a tool post is mounted in the T-slot of the compound to provide a vertically extending spindle or stub shaft. A cutting tool member is then secured to the tool post for mounting in operative relation with a workpiece. As herein used, the phrase "cutting tool member" is intended to encompass both the tool proper having a sharpened cutting edge and that element which is conventionally referred to as a tool holder. In conventional terminology, the "tool holder" receives the cutting tool proper and is in turn secured to the tool post or spindle in some appropriate manner. As will be understood, the conventional tool post may define a vertical axis of rotation about which the cutting tool member rotates away from engagement with the workpiece, in evidencing the difficulty disclosed hereinabove.

In accordance with the present invention, the lathe cutting tool mounting arrangement generally indicated at 30 is mounted on the compound 26 for supporting a cutting tool member in operative arrangement with the workpiece W. The arrangement 30 comprises first block means 31, second block means 32, first elongate spindle means 34 and second elongate spindle means 35 (FIGS. 2–8). The first and second elongate spindle means 34, 35 penetrate the first and second block means 31, 32 for mounting the block means in superposed relation and for rotation about an axis defined by the spindle means. Further the spindle means 34, 35 include wedging means acting therebetween for selectively locking the first and second spindle means together and for selectively precluding relative rotation therebetween, as disclosed more fully hereinafter.

In assembling the mounting arrangement 30 of the present invention for use with the lathe 20, a T-base 36 (FIGS. 5–8) is fixed to the lower extremity of the first spindle means 34 for entering into the T-slot of the compound 26. The T-base 36 provides an abutment surface against which the lowermost of the first and second block means 31, 32 may rest and locks the first spindle means 34 to the compound 26 for precluding relative rotation therebetween. Locking of the T-base 36 and first spindle means 34 is accomplished by means of a set screw 38 (FIGS. 6 and 8) entering into a mating recess 39 in the first spindle means 34. In order to assure an accurate fit between the T-base 36 and the T-slot in the compound 26, a lash adjustment is provided through means of a slotted portion 40 of the T-base 36 and a cooperating pair of locking set screws 41, 42. By adjustment of the locking set screws 41, 42, the gap in the slotted portion 40 of the T-base 36 may be adjusted for an accurate sliding fit into the compound 26.

In accordance with the present invention, the first and second block means 31, 32 are particularly constructed and arranged to accommodate a variety of cutting tool members useable with the lathe 20. Such accommodation is accomplished in part by inversion of the block means and in part by rotation thereof about the spindle means 34, 35. By way of example, the mounting arrangement 30 is illustrated in FIG. 2 as accommodating a conventional tool holder TH1 which in turn mounts a conventional tool steel cutting tool CT1. In FIG. 3, a replaceable carbide cutting tool CT2 mounted in the appropriate tool holder TH2 therefor is shown as being accommodated. In FIG. 7, a first boring bar BB1 is shown as being accommodated. For clarity, the cutting tool of FIG. 3 is shown individually in FIG. 11 and the boring bar of FIG. 7 is shown individually in FIG. 12. A second type of boring bar, to be mentioned hereinafter, is shown individually in FIG. 13. In order to accommodate such a variety of cutting tool members, block means 31, 32 have opposing cutting tool member engaging faces for gripping engagement with the cutting tool member disposed therebetween. Further, each of the block means 31, 32 includes a plurality of engagement areas of such faces for receiving a corresponding plurality of types of cutting tool members. In particular, at least one of the face engagement areas 44, 45 includes a V-groove formed in at least one of the block means 31, 32 for receiving a boring bar (FIGS. 4 and 7). Other face engagement areas include areas 48, 49 defined by first and second rocker members 51, 52 and areas generally indicated at 54 and 55 defined by knurled surface pads 56, 58, 59, 61. The knurled surface pads are secured to corresponding ones of the block means 31, 32 by appropriate threaded fasteners.

It is contemplated by the present invention that the adaptability provided by the opposing cutting tool member engaging faces of the block means 31, 32 be further enhanced by the provision of spacer means accommodating the mounting arrangement 30 of the present invention to cutting tool members of varying dimensions. Two such spacer means are illustrated in FIGS. 2–4. First, an auxiliary V-block means 62 may be used in conjunction with the rocker member face areas 48, 49 if desired to accommodate a boring bar such as the second boring bar BB2 of FIG. 13. Further, an auxiliary spacer bar means 64 is particularly constructed and arranged for cooperation with the knurled pad members 56, 58, 59 and 61 as in accommodating a carbide tip tool holder TH2. In order to open the possibility of a greater range of accommodation, the auxiliary spacer bar means 64 includes a slotted dowel 65 sized to be received within corresponding bores 66, 67 formed in the first and second block means 31, 32 (FIG. 4).

By way of illustration of the various arrangements accommodated by the present invention, it is to be noted that a conventional tool holder TH1 is arranged (FIG. 2) to be disposed between the rocker members 51, 52. Each of the rocker members 51, 52 is received within a corresponding arcuate slot formed in the corresponding one of the first and second block means 31, 32. In each instance, the rocker members 51, 52 are provided with arcuate grooves in one side face thereof to receive spring loaded locking balls also mounted within the first and second block means 31, 32 (see FIGS. 4 and 8). By the provision of the first and second rocker members 51, 52, the conventional tool holder TH1 is mounted for rotation about an axis perpendicular to the axis defined by the elongate spindle means 34, 35. Thus, the angle of rake of the conventional cutting tool CT1 relative to the workpiece W can be adjusted.

It will be observed that the first boring bar BB1 (FIG. 12) is formed with a longitudinal groove therein. This groove is provided to receive a spring loaded locking pin means 70, 71 arranged within the V-grooves 44, 45. By means of compression springs 73, 74 underlying the locking pin means 72, 70, the locking pin means are biased toward protrusion into the V-grooves and engage in the longitudinal groove formed in the boring bar. By such engagement, the engaged boring bar BB1 is locked against rotation about its longitudinal axis during a boring operation. By the spring biasing of the locking pin means 70, 71 no difficulty is introduced by mounting of a boring bar in the V-grooves 44, 45 which does not have a longitudinal groove formed therein even though, in such instance, the rotational locking feature of the present invention is not employed. Retaining screws 75, 76 are arranged to normally retain the locking pin means 71, 70 in position in the block means 31, 32 and may be employed to lock the pin means 71, 70 in retracted position if so desired.

Persons skilled in the use of boring bars such as first conventional boring bar BB1 will recognize that forces arising during cutting operation and acting on the boring bar will tend to separate the block means 31, 32. In the arrangement of the present invention, such forces are readily taken up and spindle cramping is avoided, through the provision of heel pins 91, 92 (FIGS. 2, 3, 4 and 10). Each of the heel pins 91, 92 is an elongate threaded member having longitudinal grooves therein for receiving a rotation limiting pin 90. By means of cooperating adjustment nuts 93, 94 each of the heel pins 91, 92 may be extended from the first block means into engagement with the overlying second block means 32. Such extension of the heel pins 91, 92 permits forces to be taken up without cramping of the block means 31, 32 on the spindle means 34, 35.

In accordance with the present invention, the first and second block means 31, 32 are maintained in a predetermined alignment during cutting operations. In maintaining this alignment, first and second block means 31, 32 are also locked together in such a manner as to preclude relative rotation therebetween. This latter function is particularly served by alignment pin means including first and second spring loaded dowels generally indicated at 78, 79 respectively. Each of the spring loaded dowels includes a tubular first dowel member 80, 81 received in a mating bore in the first block means 31 and a telescoping second dowel member 82, 85 received within a corresponding one of the first dowel members 80, 81. Compression springs 86, 87 are enclosed within the tubular dowel members 80, 81 and act to urge the smaller diameter dowel means through an extended position so as to bias the block means 31, 32 toward a separated position. Inasmuch as the tubular dowel members 80, 81 extend into both of the block means 31, 32 (FIG. 8), the alignment pin means 78, 79 cooperate in precluding relative rotation between the block means.

As will be understood, separation of the second block means 32 from the first block means 31 might be envisioned as readily occurring in the event the block means were lifted from the spindle means 34, 35. However, a separation prevention means is included for normally precluding such separation of the block means one from another. In the form illustrated, the separation prevention means comprises a locking screw 90 which normally penetrates the second block means 32 and threadedly engages the first block means 31. Thus, the block means may be readily lifted from the spindle means 34, 35 inverted and replaced thereon if required in accommodation of a particular variety of cutting tool member.

In order to accommodate cutting tool members of varying height dimensions while placing the cutting edges thereof in proper operative relation with the workpiece W, the present invention contemplates that the height dimensions of the block means 31, 32 be different. As a result, cutting tool members of varying dimensions may be accommodated by inverting the block means 31, 32 and placing first one and then the other of the block means in the uppermost position. By way of example, the dimensions of the V-grooves 44, 45 are particularly correlated with the dimensions of the T-base 36 and the compound 26 in order to place the centers of at least two conventionally sized boring bars directly on the center of rotation of a workpiece W. Thus, shimming in order to so position a boring bar is avoided.

In accordance with the present invention, one of spindle means 34, 35 is normally operatively interconnected with the block means 31, 32 for preclusion of relative rotation therebetween. As pointed out hereinabove, the first spindle means 34 is locked against relative rotation to the T-base 36. Thus, the second elongate spindle means 35 is operatively interconnected with the block means. In the form illustrated, such interconnection is accomplished through a crown means 95 having a protruding pin 96 for locking the crown means and the uppermost of the block means 31, 32 together. It is to be noted that each of the block means 31, 32 is formed with an annular recess 98 about the spindle opening for receiving the lowermost end of the crown means 95 and is provided with a locking cavity 99 for reception of the locking pin 96. Thus, the crown means 95 provides the locking function with either of the block means 31, 32 in the uppermost position.

Locking engagement between the crown means 95 and the second spindle means 35 is accomplished through the provision of a locking collar 100 which encircles the second spindle means 35 and is secured thereto by means of a set screw 101 (FIG. 7). The locking collar 100 and crown means 95 have cooperating keyways formed therein for reception of a locking key 102 (FIGS. 7–9). Desirably, any slack or lash in engagement with the key 102 is taken up by a longitudinal slot in the locking collar 100 and a slack adjustment screw 104 extending thereacross (FIGS. 8 and 9). Thus, on rotation of the block means 31, 32 about the generally vertical axis defined by the spindle means 34, 35 the second spindle means 35 rotates with the block means 31, 32 and moves relative to the first spindle means 34.

In accordance with an important feature of the present invention, the spindle means 34, 35 includes wedging means acting therebetween. The wedging means employed in the arrangement of the present invention operates by longitudinal movement of the second spindle means 35 relative to the first spindle means 34. For this reason, the second spindle means 35 may be characterized as a draw bolt which penetrates the tubular member forming the first spindle means 34 (FIGS 6–8). Adjacent the lower extremities of the draw bolt forming the second spindle member 35 and the tubular member forming the first spindle means 34, the tubular member has a tapered surface portion 105 (FIG. 6) of an inside wall surface thereof while the draw bolt has a matingly tapered exterior surface portion 106. Desirably, the taper of these surfaces is approximately 3½ inches per foot, or just above a critical angle of 16°. The purpose of this critical taper will become clear from the discussion which follows.

The upper extremity of the draw bolt forming the second spindle member 35 is provided with a threaded portion 108. Intermediate the threaded portion 108 and the tapered surface 106 is a retraction groove 109 engaged by retraction springs 110, 111 which are mounted to the tubular member forming the first spindle means 34 by the use of appropriate threaded fasteners (FIG. 6). The retractor springs 110, 111 provide a force acting between the first and second spindle means 34, 35 in such a manner as to move the matingly tapered surfaces 105, 106 slightly out of engagement.

In accordance with the present invention, wedging action between the tapered surfaces 105, 106 is instituted by clamping means which impose on the block means and spindle means a force which urges the block means in gripping relation with the cutting tool members supported therebetween. In the form illustrated, the clamping means comprises a clamping nut 114 mounted on the threaded portion 108 at the upper extremity of the second spindle means 35. Upon tightening of the clamping nut 114, a force acting between the nut and the T-base 36 arises to move the block means 31, 32 together into clamping relation on any cutting tool member supported therebetween and to pull the draw bolt forming the second spindle means 35 upwardly relative to the tubular member forming the first spindle means 34. With engagement of the tapered surfaces 105, 106 of the spindle means, wedging action occurs to lock the spindle means against rotation one relative to the other. Upon loosening of the clamping nut 114, the retraction springs 110, 111 draw the tapered surfaces apart and release the spindle means for relative rotation. Such release of the wedging action is facilitated by the particular tapered angle chosen.

In use of the mounting arrangement of the present invention, the cutting tool member to be employed is selected for the particular job assigned. The block 31, 32 are then arranged with the desired orientation to accommodate the particular cutting tool member to be supported and the cutting tool member is positioned between the block means 31, 32. The cutting edge of the cutting tool member is then disposed in the desired position for cutting operation and the clamping nut 14 tightened. On tightening of the clamping nut 14, the mounting arrangement of the present invention is fully locked into position required to accommodate cutting operations. Further, due to the very tight locking action of the wedging means incorporated in the spindle means, any forces arising during cutting operations are resisted and the cutting edge is maintained in the desired aligned position.

In the drawings and specification, there has been set forth a preferred embodiment of the invention, and although specific terms are employed, they are used in a generic and descriptive sense only and not for purposes of limitation.

That which is claimed is:

1. A lathe cutting tool mounting arrangement having enhanced resistance to forces arising during cutting operations and comprising:

first and second block means for supporting a cutting tool member in operative relation with a workpiece, first and second elongate spindle means penetrating said first and second block means for mounting said block means in superposed relation and for rotation about an axis defined by said spindle means, said spindle means including wedging means acting therebetween for selectively locking said first and second spindle means together and for selectively precluding relative rotation therebetween, coupling means operatively interconnecting said first block means, said second block means and one of said first and second spindle means for locking said block means and said one spindle means together and for precluding relative rotation therebetween, and clamping means for imposing on said block means and said spindle means a force urging said block means into gripping relation with a cutting tool member supported therebetween and actuating said wedging means to lock said block means and spindle means together against rotation.

2. A lathe cutting tool mounting arrangement according to claim 1 wherein aid first block means and said second block means have different predetermined dimensions measured along said spindle means axis whereby inversion of said block means accommodates cutting tool members of varying dimension.

3. A lathe cutting tool mounting arrangement according to claim 1 wherein one of said block means has a V-groove formed therein for receiving a boring bar and further wherein said one block means includes locking pin means mounted in said V-groove and biased toward protrusion thereinto for engagement in a boring bar and for locking an engaged bar against rotation about its longitudinal axis.

4. A lathe cutting tool mounting arrangement according to claim 1 wherein said block means have opposing cutting tool member engaging faces for gripping engagement with a cutting tool member disposed therebetween and further wherein each of said block means faces includes a plurality of engagement areas for receiving a corresponding plurality of types of cutting tool members.

5. A lathe cutting tool mounting arrangement according to claim 4 wherein at least one of said face engagement areas includes a V-groove formed in one of said block means for receiving a boring bar.

6. A lathe cutting tool mounting arrangement according to claim 4 wherein said block means include first and second rocker members in opposing face engagement areas for rotation of a cutting tool member disposed therebetween about an axis perpendicular to said spindle means axis.

7. A lathe cutting tool mounting arrangement according to claim 4 wherein said block means includes spacer bar means and attachment means in opposing face engagement areas for receiving said spacer bar means whereby said block means are accommodated to cutting tool members of varying dimension.

8. A lathe cutting tool mounting arrangement according to claim 1 wherein said first spindle means comprises a tubular member having an inside wall surface and said second spindle means comprises a draw-bolt extending within said tubular member and normally movable relative to said inside wall surface.

9. A lathe cutting tool mounting arrangement according to claim 8 wherein said wedging means comprises a tapered surface portion of said inside wall surface and a matingly tapered exterior surface portion of said drawbolt.

10. A lathe cutting tool mounting arrangement according to claim 8 wherein said drawbolt is operatively interconnected with said coupling means and functions as said one spindle means.

11. A lathe cutting tool mounting arrangement according to claim 1 wherein said coupling means includes alignment pin means extending between said first and second block means for precluding relative rotation therebetween and separation prevention means for normally precluding separation of said block means one from another.

12. A lathe cutting tool mounting arrangement according to claim 1 wherein said coupling means includes crown means for overlying one of said block means and having a protruding pin for locking said crown means and said one block means together and further wherein both of said block means have bores therein disposed for receiving said pin of said crown means whereby either of said block means may function as said one block means.

13. A lathe cutting tool mounting arrangement according to claim 1 wherein said one spindle means has an end portion extending beyond said block means and the other of said spindle means and said clamping means comprises a force transferring member engaging said end portion of said one spindle means and operatively connected with one of said block means for imposition of said force thereon.

* * * * *